(12) United States Patent
Liao

(10) Patent No.: US 9,164,331 B2
(45) Date of Patent: Oct. 20, 2015

(54) LIQUID CRYSTAL LENS, LIQUID CRYSTAL DEVICE AND PROCESS FOR MANUFACTURING LIQUID CRYSTAL LENS

(71) Applicant: Shenzhen China Star Optoelectronics Technology Co., Ltd., Shenzhen, Guangdong (CN)

(72) Inventor: Qiaosheng Liao, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 72 days.

(21) Appl. No.: 14/129,283

(22) PCT Filed: Dec. 2, 2013

(86) PCT No.: PCT/CN2013/088320
§ 371 (c)(1),
(2) Date: Dec. 25, 2013

(87) PCT Pub. No.: WO2015/074292
PCT Pub. Date: May 28, 2015

(65) Prior Publication Data
US 2015/0146151 A1    May 28, 2015

(30) Foreign Application Priority Data

Nov. 22, 2013  (CN) .......................... 2013 1 0592438

(51) Int. Cl.
 G02F 1/13      (2006.01)
 G02F 1/1335    (2006.01)
 G02F 1/1343    (2006.01)

(52) U.S. Cl.
 CPC ................................ G02F 1/134309 (2013.01)

(58) Field of Classification Search
 CPC ....... G02B 3/12; G02B 3/14; G02F 1/134309
 USPC .................................. 349/200, 117, 127, 187
 See application file for complete search history.

(56) References Cited

U.S. PATENT DOCUMENTS

| 7,474,367 B2 * | 1/2009 | Ozawa ............. G02F 1/133555 349/114 |
| 2007/0097313 A1 * | 5/2007 | Hayashi et al. ................ 349/168 |
| 2012/0293503 A1 * | 11/2012 | Miyazawa et al. ............ 345/419 |

* cited by examiner

Primary Examiner — Nathanael R Briggs
(74) Attorney, Agent, or Firm — Andrew C. Cheng

(57) ABSTRACT

An LC lens is provided, including an upper substrate; a lower substrate; a first electrode layer disposed on a side of the upper substrate, facing the lower substrate, and being of an integral conductive material; a second electrode layer disposed on a side of the lower substrate, facing the upper substrate, including several strips of electrodes and being opposite to the first electrode layer; an LC layer disposed between the first and second electrode layers; and a thin film layer coated on a side of the second electrode layer, facing the LC layer; and further a cured LC layer disposed between the thin film layer and second electrode layer. An LCD device and a process for manufacturing an LC lens are also provided. With them, the extra cost problem encountered when manufacturing an LCD device can be solved, and the interface scattering phenomenon occurring during light transmission can be ameliorated.

15 Claims, 2 Drawing Sheets

US 9,164,331 B2

LIQUID CRYSTAL LENS, LIQUID CRYSTAL DEVICE AND PROCESS FOR MANUFACTURING LIQUID CRYSTAL LENS

CROSS REFERENCE TO RELATED APPLICATIONS

The present application claims priority to Chinese Patent Application No. 201310592438.9, filed Nov. 22, 2013, and entitled "liquid crystal lens, liquid crystal display device, and process for manufacturing liquid crystal lens". The entire contents of the above-mentioned patent application are cited and incorporated herein for reference.

FIELD OF THE INVENTION

The present invention relates to a field of liquid crystal display techniques, and more particularly to a liquid crystal lens, a liquid crystal display device and a process for manufacturing a liquid crystal lens.

BACKGROUND OF THE INVENTION

A liquid crystal lens (LC lens) is created based on unique physical and optical features of liquid crystal material. Unlike conventional glass lens, an LC lens may converge or diverge light passing therethough in response to an electric field applied thereto. When indium tin oxide (ITO) electrodes contained therein are configured as strips, the lens may function like a lenticular lens. By properly disposing the lens above an LC panel, the image of right-eye pixels can be refracted and reach the right eye of a user, and the image of left-eye pixels can be refracted and reach the left eye of the user. Therefore, stereo perception can be acquired with no need of glasses.

Please refer to FIG. 1. In a common LC display device, light is emitted out of an LC panel 1 through an LC lens 2. When an LCD device is in an off state, light passes through the LC panel 1 and the LC lens 2 directly without change in the advancing direction. On the other hand, when the LC display device is in an on state, there will be a slant angle θ existing between the advancing direction of light through the LC panel 1 and that through the LC lens 2 as the ITO electrodes 3 in the LC lens 2 have the deflective slant angle θ from a central axis extending along width of the LC lens.

As shown in FIG. 2, the LCD device includes an LC panel 1, an LC lens 2 and a slant polarization sheet 4 disposed between the LC panel 1 and the LC lens 2. The LC lens 2 is composed of an upper glad substrate 21, a first electrode layer 22, an LC layer 23, a thin film layer 24, a second electrode layer 25 and a lower glass substrate 26. After light is emitted out of the LC panel 1, deflection of light occurs due to the slant angle θ existing between the LC panel 1 and the LC lens 2. Therefore, it is necessary to dispose the slant polarization sheet 4 between the LC panel 1 and the LC lens 2 to rotate the emitted light by an angle of 90-θ so as to assure of the linearity of the light.

The LCD device has the following drawbacks. For display manufacturers, disposing the slant polarization sheet 4 between the LC panel 1 and the LC lens 2 requires additional cost. Moreover, due to the existence of the slant polarization sheet 4 between the LC panel 1 and the LC lens 2, an interface scattering effect would become significant and light concentration effect would be deteriorated.

SUMMARY OF THE INVENTION

The present invention aims to solve the technical problems of extra cost in manufacturing LCD devices and interface scattering phenomenon during light transmission by providing an LC lens, an LCD device and a manufacturing process of an LCD device.

In order to solve the above-mentioned technical problems, an LC lens is provided as a first technical solution according to the present invention, which includes:
  an upper substrate;
  a lower substrate;
  a first electrode layer disposed on a side of the upper substrate, facing the lower substrate, the first electrode layer being of an integral conductive material;
  a second electrode layer disposed on a side of the lower substrate, facing the upper substrate, the second electrode layer including several strips of electrodes and being opposite to the first electrode layer;
  a liquid crystal layer disposed between the first electrode layer and the second electrode layer; and
  a thin film layer coated on a side of the second electrode layer, facing the liquid crystal layer;
and further comprising a cured liquid crystal layer disposed between the thin film layer and the second electrode layer.

In an embodiment, the liquid crystal material of the cured liquid crystal layer is identical to that of the liquid crystal layer.

In an embodiment, the several strips of electrodes in the second electrode layer are substantially equally spaced.

In an embodiment, the several strips of electrodes are substantially identical in thickness.

In an embodiment, the several strips of electrodes are substantially concentrically or helically formed.

In order to solve the above-mentioned technical problems, an LCD device is provided as a second technical solution according to the present invention, which includes:
  an upper substrate;
  a lower substrate;
  a first electrode layer disposed on a side of the upper substrate, facing the lower substrate, the first electrode layer being of an integral conductive material;
  a second electrode layer disposed on a side of the lower substrate, facing the upper substrate, the second electrode layer including several strips of electrodes and being opposite to the first electrode layer;
  a liquid crystal layer disposed between the first electrode layer and the second electrode layer;
  a thin film layer coated on a side of the second electrode layer, facing the liquid crystal layer; and
  a cured liquid crystal layer disposed between the thin film layer and the second electrode layer;
  wherein the lower glass substrate of the liquid crystal lens is contiguous to the liquid crystal panel.

In an embodiment, the liquid crystal material of the cured liquid crystal layer is identical to that of the liquid crystal layer.

In an embodiment, the several strips of electrodes in the second electrode layer are substantially equally spaced.

In an embodiment, the several strips of electrodes are substantially identical in thickness.

In an embodiment, the several strips of electrodes are substantially concentrically or helically formed.

In order to solve the above-mentioned technical problems, a process for manufacturing an LC lens is provided as a third technical solution according to the present invention, which includes:
  providing a lower glass substrate, and disposing a second electrode layer including several strips of electrodes above the lower glass substrate;

disposing a cured liquid crystal layer above the second electrode layer;

coating a thin film layer above the cured liquid crystal layer, and disposing a liquid crystal layer above the thin film layer;

disposing a first electrode layer composed of an integral conductive material on the liquid crystal layer, and disposing an upper glass substrate above the first electrode layer; and binding the lower glass substrate and the upper glass substrate with a sealant.

In an embodiment, the liquid crystal material of the cured liquid crystal layer is identical to that of the liquid crystal layer.

In an embodiment, the several strips of electrodes in the second electrode layer are substantially equally spaced.

In an embodiment, the several strips of electrodes are substantially identical in thickness.

In an embodiment, the several strips of electrodes are substantially concentrically or helically formed.

In the LC lens, LCD device and process for manufacturing LC lens according to the present invention, the cured LC layer is provided in the LC lens and disposed between the thin film layer and the second electrode layer to substitute for the slant polarization sheet conventionally disposed between the LC lens and the LC panel, thereby exempting from additional cost to be paid by a manufacturer for the slant polarization sheet. Furthermore, the same LC material used for the cured LC layer and the LC layer in the LC lens reduces the interface scattering occurring during light transmission and enhances the light-concentrating effect.

Figure 1:
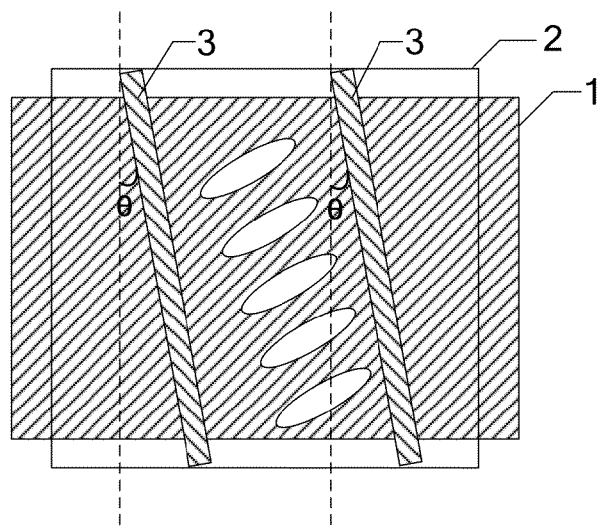
FIG. 1 is a top plane view schematically illustrating an LCD device according to prior art.
Figure 2:
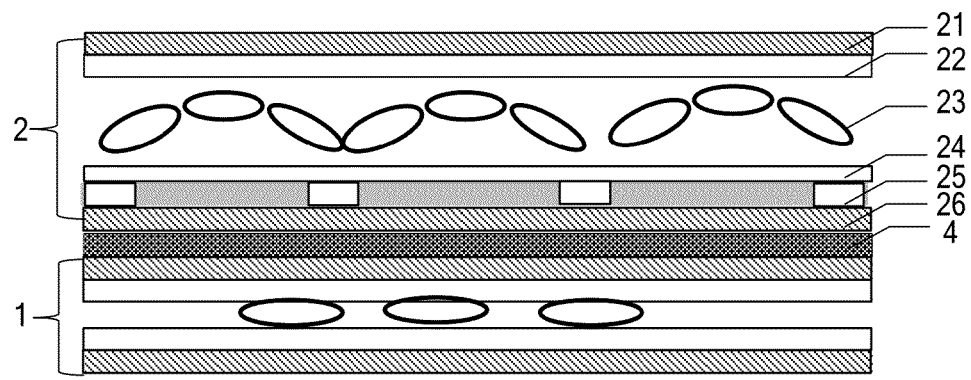
FIG. 2 is a cross-sectional view schematically illustrating an LCD device according to prior art.

In the drawings: 1—LC panel; 2—LC lens; 3—ITO electrodes; 4—slant polarization sheet; 5—cured LC layer; 21—upper glass substrate; 22—first electrode layer; 23—LC layer; 24—thin film layer; 25—second electrode layer; and 26—lower glass substrate.

DETAILED DESCRIPTION OF THE PREFERRED EMBODIMENTS

Hereinafter, detailed descriptions of the invention are given with combined drawings and preferred embodiments.

Figure 3:
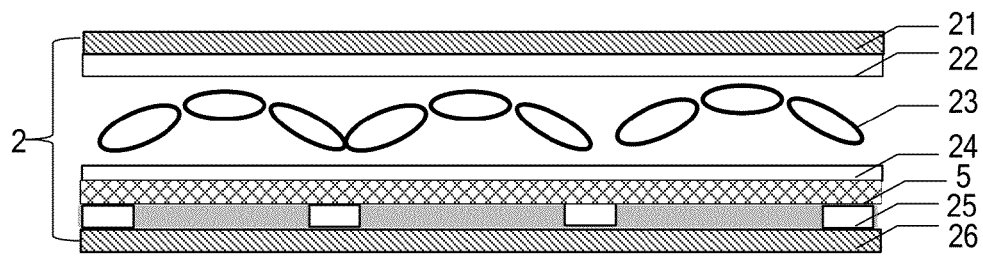
FIG. 3 is a cross-sectional view schematically illustrating an LC lens structure provided in a first embodiment of the present invention.

With reference to FIG. 3, an embodiment of an LC lens according to the present invention is illustrated.

FIG. 3 is a cross-sectional view schematically illustrating an LC lens structure provided in a first embodiment of the present invention. An LC lens 2 according to the embodiment of the present invention includes:

an upper substrate 21;
a lower substrate 26;

a first electrode layer 22 disposed on a side of the upper substrate 21, facing the lower substrate 26, the first electrode layer 22 being of an integral conductive material;

a second electrode layer 25 disposed on a side of the lower substrate 26, facing the upper substrate 21, the second electrode layer 25 including several strips of electrodes and being opposite to the first electrode layer 22;

a liquid crystal layer 23 disposed between the first electrode layer 22 and the second electrode layer 25; and a thin film layer 24 coated on a side of the second electrode layer 25, facing the liquid crystal layer 23;

and further comprising a cured liquid crystal layer 5 disposed between the thin film layer 24 and the second electrode layer 25.

In an embodiment, the liquid crystal material of the cured liquid crystal layer 5 is identical to that of the liquid crystal layer 23.

In an embodiment, the several strips of electrodes in the second electrode layer 25 are substantially equally spaced.

In an embodiment, the several strips of electrodes are substantially identical in thickness.

In an embodiment, the several strips of electrodes are substantially concentrically or helically formed.

Figure 4:
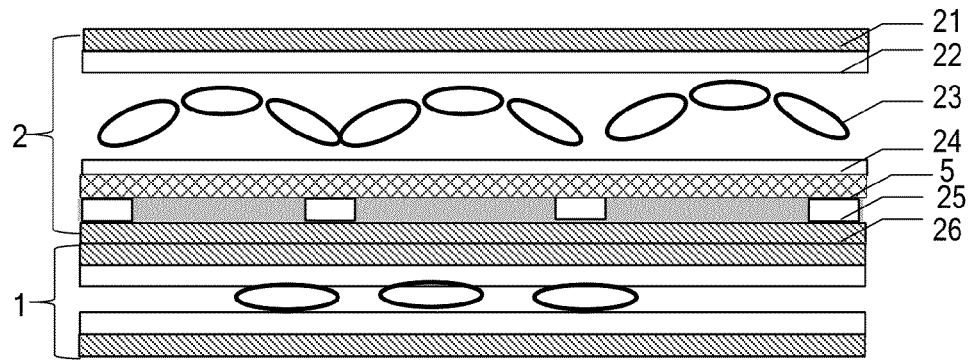
FIG. 4 is a cross-sectional view schematically illustrating an LCD device structure provided in a second embodiment of the present invention.

With reference to FIG. 4, an embodiment of an LCD device according to the present invention is illustrated.

FIG. 4 is a cross-sectional view schematically illustrating an LCD device structure provided in a second embodiment of the present invention. The LCD device according to the embodiment of the present invention includes an LC panel 1 and an LC lens 2. The LC lens 2 includes:

an upper substrate 21;
a lower substrate 26;

a first electrode layer 22 disposed on a side of the upper substrate 21, facing the lower substrate 26, the first electrode layer 22 being of an integral conductive material;

a second electrode layer 25 disposed on a side of the lower substrate 26, facing the upper substrate 21, the second electrode layer 25 including several strips of electrodes and being opposite to the first electrode layer 22;

a liquid crystal layer 23 disposed between the first electrode layer 22 and the second electrode layer 25;

a thin film layer 24 coated on a side of the second electrode layer 25, facing the liquid crystal layer 23; and a cured liquid crystal layer 5 disposed between the thin film layer 24 and the second electrode layer 25;

wherein the lower glass substrate 26 of the liquid crystal lens 2 is contiguous to the liquid crystal panel 1.

In an embodiment, the liquid crystal material of the cured liquid crystal layer 5 is identical to that of the liquid crystal layer 23 of the liquid crystal lens 2.

In an embodiment, the several strips of electrodes in the second electrode layer 25 of the liquid crystal lens 2 are substantially equally spaced.

In an embodiment, the several strips of electrodes are substantially identical in thickness.

In an embodiment, the several strips of electrodes in the second electrode layer 25 of the liquid crystal lens 2 are substantially concentrically or helically formed.

The operational principles of the LC lens and the LCD device are as follows. After light is emitted out of the LC panel 1, deflection of light occurs due to the slant angle $\theta$ existing between the LC panel 1 and the LC lens 2. When entering the LC lens 2, due to the birefringence feature of liquid crystal, the deflected light can be rotated with an angle of $2\theta$ so as to be recovered to the originally linear state by making the thickness $\Delta n*d$ of the cured LC layer 5 a half of wavelength of the light, wherein $\Delta n$ denotes anisotropy in refractive index of liquid crystal, d denotes the thickness of the liquid crystal in the LC lens 2, and the deflected light is 45 degrees from the lengthwise central axis of the LC lens 2. In this way, the light deflection can be corrected. The curing for the cured LC layer 5 may be implemented with solubility change of LC monomers or a photochemical process.

Figure 5:
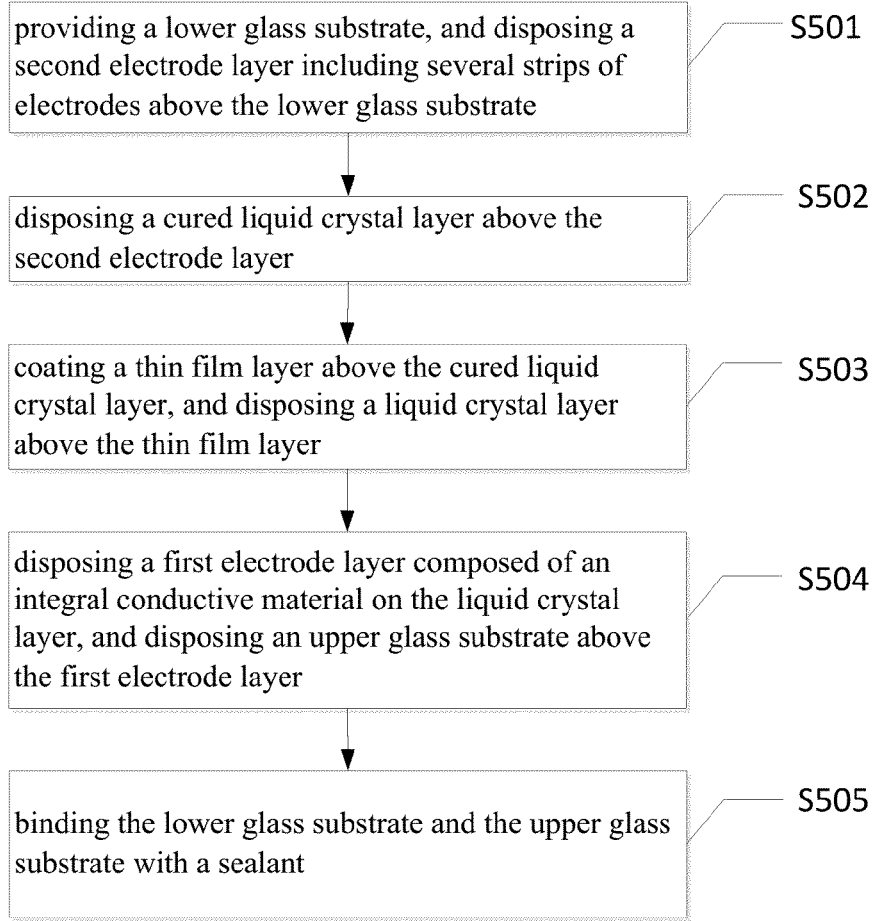
FIG. 5 is a flowchart illustrating a manufacturing process of an LC lens provided in a third embodiment of the present invention.

With reference to FIG. 5, an embodiment of LCD device according to the present invention is illustrated.

FIG. 5 is a flowchart illustrating a process for manufacturing an LCD lens provided in a third embodiment of the present invention. Referring to the LC lens according to the present invention, the process for manufacturing the LC lens according to the embodiment of the present invention includes:

Step S501: providing a lower glass substrate, and disposing a second electrode layer including several strips of electrodes above the lower glass substrate;

Step S502: disposing a cured liquid crystal layer above the second electrode layer;

Step S503: coating a thin film layer above the cured liquid crystal layer, and disposing a liquid crystal layer above the thin film layer;

Step S504: disposing a first electrode layer composed of an integral conductive material on the liquid crystal layer, and disposing an upper glass substrate above the first electrode layer; and Step S505: binding the lower glass substrate and the upper glass substrate with a sealant.

In an embodiment, the liquid crystal material of the cured liquid crystal layer is identical to that of the liquid crystal layer.

In an embodiment, the several strips of electrodes in the second electrode layer are substantially equally spaced.

In an embodiment, the several strips of electrodes are substantially identical in thickness.

In an embodiment, the several strips of electrodes are substantially concentrically or helically formed.

The LC lens, LCD device and process for manufacturing an LC lens provided according to the present invention can be practiced with the following benefits.

Since the cured LC layer is provided in the LC lens and disposed between the thin film layer and the second electrode layer to substitute for the slant polarization sheet conventionally disposed between the LC lens and the LC panel, additional cost to be paid by a manufacturer for the slant polarization sheet can be exempted from. Furthermore, the same LC material used for the cured LC layer and the LC layer in the LC lens reduces the interface scattering occurring during light transmission and enhances the light-concentrating effect.

Those disclosed above are only preferred embodiments according to the present invention and should not be used for limiting the scope of the invention. All the equivalent variations are considered within the scope of the invention.

What is claimed is:

1. A liquid crystal lens, comprising:
    an upper substrate;
    a lower substrate;
    a first electrode layer disposed on a side of the upper substrate, facing the lower substrate, the first electrode layer being of an integral conductive material;
    a second electrode layer disposed on a side of the lower substrate, facing the upper substrate, the second electrode layer including several strips of electrodes and being opposite to the first electrode layer;
    a liquid crystal layer disposed between the first electrode layer and the second electrode layer;
    a thin film layer coated on a side of the second electrode layer, facing the liquid crystal layer;
    and further comprising a cured liquid crystal layer disposed between the thin film layer and the second electrode layer,
    wherein a thickness of the cured liquid crystal layer is made a half of wavelength of a light emitted into the cured liquid crystal layer.

2. The liquid crystal lens according to claim 1, wherein the liquid crystal material of the cured liquid crystal layer is identical to that of the liquid crystal layer.

3. The liquid crystal lens according to claim 2, wherein the several strips of electrodes in the second electrode layer are substantially equally spaced.

4. The liquid crystal lens according to claim 3, wherein the several strips of electrodes are substantially identical in thickness.

5. The liquid crystal lens according to claim 4, wherein the several strips of electrodes are substantially concentrically or helically formed.

6. A liquid crystal display device, comprising a liquid crystal panel and further comprising a liquid crystal lens, wherein the liquid crystal lens comprises:
    an upper substrate;
    a lower substrate;
    a first electrode layer disposed on a side of the upper substrate, facing the lower substrate, the first electrode layer being of an integral conductive material;
    a second electrode layer disposed on a side of the lower substrate, facing the upper substrate, the second electrode layer including several strips of electrodes and being opposite to the first electrode layer;
    a liquid crystal layer disposed between the first electrode layer and the second electrode layer;
    a thin film layer coated on a side of the second electrode layer, facing the liquid crystal layer; and
    a cured liquid crystal layer disposed between the thin film layer and the second electrode layer;
    wherein the lower glass substrate of the liquid crystal lens is contiguous to the liquid crystal panel, and a thickness of the cured liquid crystal layer is made a half of wavelength of a light emitted into the cured liquid crystal layer.

7. The liquid crystal display device according to claim 6, wherein the liquid crystal material of the cured liquid crystal layer is identical to that of the liquid crystal layer.

8. The liquid crystal display device according to claim 7, wherein the several strips of electrodes in the second electrode layer are substantially equally spaced.

9. The liquid crystal display device according to claim 8, wherein the several strips of electrodes are substantially identical in thickness.

10. The liquid crystal display device according to claim 9, wherein the several strips of electrodes are substantially concentrically or helically formed.

11. A process for manufacturing a liquid crystal lens, comprising steps of:
    providing a lower glass substrate, and disposing a second electrode layer including several strips of electrodes above the lower glass substrate;
    disposing a cured liquid crystal layer above the second electrode layer;
    coating a thin film layer above the cured liquid crystal layer, and disposing a liquid crystal layer above the thin film layer;

disposing a first electrode layer composed of an integral conductive material on the liquid crystal layer, and disposing an upper glass substrate above the first electrode layer; and binding the lower glass substrate and the upper glass substrate with a sealant, wherein a thickness of the cured liquid crystal layer is made a half of wavelength of a light emitted into the cured liquid crystal layer.

12. The process according to claim 11, wherein the liquid crystal material of the cured liquid crystal layer is identical to that of the liquid crystal layer.

13. The process according to claim 12, wherein the several strips of electrodes in the second electrode layer are substantially equally spaced.

14. The process according to claim 13, wherein the several strips of electrodes are substantially identical in thickness.

15. The process according to claim 14, wherein the several strips of electrodes are substantially concentrically or helically formed.

* * * * *